US009405409B1

(12) United States Patent
Grivna et al.

(10) Patent No.: US 9,405,409 B1
(45) Date of Patent: Aug. 2, 2016

(54) METHOD AND APPARATUS FOR PIPELINED CONVERSIONS IN TOUCH SENSING SYSTEMS

(75) Inventors: Edward L. Grivna, Brooklyn Park, MN (US); Hans Van Antwerpen, Mountain View, CA (US); Patrick Prendergast, Clinton, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 909 days.

(21) Appl. No.: 13/341,285

(22) Filed: Dec. 30, 2011

Related U.S. Application Data (60) Provisional application No. 61/472,178, filed on Apr. 5, 2011.

(51) Int. Cl.
   *G06F 3/044* (2006.01)
   *G06F 3/0354* (2013.01)
   *G06F 3/041* (2006.01)

(52) U.S. Cl.
   CPC ............ *G06F 3/044* (2013.01); *G06F 3/03547* (2013.01); *G06F 3/0416* (2013.01)

(58) Field of Classification Search
   CPC .... G06F 3/044; G06F 3/0416; G06F 3/03547
   USPC ........................................................ 702/65
   See application file for complete search history.

(56) References Cited

U.S. PATENT DOCUMENTS

| 7,812,827 | B2 | 10/2010 | Hotelling et al. |
| 7,831,070 | B1 | 11/2010 | Cheng et al. |
| 8,810,543 | B1 * | 8/2014 | Kurikawa ...................... 345/174 |
| 2008/0158177 | A1 * | 7/2008 | Wilson et al. ................. 345/173 |
| 2008/0162751 | A1 * | 7/2008 | Wilson ............................ 710/52 |
| 2009/0045822 | A1 | 2/2009 | Nosovitsky et al. |
| 2009/0322410 | A1 | 12/2009 | David et al. |
| 2010/0026666 | A1 | 2/2010 | Ho |
| 2010/0200310 | A1 | 8/2010 | Yeh et al. |
| 2010/0283760 | A1 * | 11/2010 | Leung ..................... G06F 3/044 345/174 |
| 2010/0295813 | A1 | 11/2010 | Kent |

OTHER PUBLICATIONS

Analog Devices, "Analog Dialogue", vol. 40, dated Nov. 4, 2006; http://www.analog.com/library/analogdialogue/cd/vol40n4.pdf.
Silicon Labs, "Sensing Multiple Channels in a Single Conversion; Low Power Capacitive Sensing", Rev 0.2, 2013; https://www.silabs.com/Support%20Documents/TechnicalDocs/AN507.pdf.

* cited by examiner

*Primary Examiner* — Michael Nghiem
*Assistant Examiner* — Peter Ngo
(74) *Attorney, Agent, or Firm* — Morgan, Lewis & Bockius LLP (57) ABSTRACT

A touch sensing system and methods of operating the same for pipelined conversions are provided. In one embodiment, the method includes: (i) configuring a capacitive sensing system including a plurality of capacitive sensing elements for a first conversion; (ii) sensing capacitance in the capacitive sensing elements, and converting the capacitance sensed in the capacitive sensing elements to a digital, first conversion result; and (iii) while converting the capacitance sensed to the first conversion result, configuring the capacitive sensing system. In another embodiment, the capacitive sensing system includes a plurality of channels, and sensing capacitance and converting the capacitance sensed to the first conversion result includes integrating analog signals from the capacitive sensing elements for one of the plurality of channels while converting the integrated signal for another of the plurality of channels to a digital subconversion result.

17 Claims, 6 Drawing Sheets

METHOD AND APPARATUS FOR PIPELINED CONVERSIONS IN TOUCH SENSING SYSTEMS

RELATED APPLICATIONS

This claims the benefit of priority under 35 U.S.C. 119(e) to U.S. Provisional Patent Application Ser. No. 61/472,178, filed Apr. 5, 2011, which is incorporated by reference herein.

TECHNICAL FIELD

The present disclosure relates generally to touch sensing systems, and more particularly to methods and apparatus for pipelined conversions in touch sensing systems.

BACKGROUND

Data processing systems, such as personal computers, tablet computers, entertainment systems, game consoles, and cellular telephones, commonly include a human interface device (HID) for data input and/or controlling cursor movement. One widely utilized HID is a touch pad or touchscreen utilizing a capacitive sensing system to detect and measure proximity, position, displacement, or acceleration of a conductive object, such as a finger or stylus. Capacitive sensing systems generally include multiple capacitive sensing elements, a measurement circuit configured to measure a change in mutual capacitance between sensing elements or a change in the self-capacitance of the sensing elements, a switching circuit to selectively couple sensing elements to the measurement circuit, a conversion circuit to convert analog changes in capacitance to digital signals or values, and a controller or processor to configure components of the capacitive sensing system and to convert changes in sensed capacitance to changes in reported proximity, position, displacement, or acceleration of one or more proximate conductive objects.

In existing capacitive sensing systems all configurations are performed by the processor as part of standard in-line code, and must be performed before a conversion process can be started. Thus, if the processor is busy servicing an interrupt or other hardware (e.g., communications interface, haptics drivers) at the time that the other components of the capacitive sensing system becomes available, the capacitive sensing system will sit idle until the processor completes its current operation, unloads results from the last conversion, loads the new conversion configuration, and then enables the conversion to start. This in turn increases response time of a touchscreen utilizing the capacitive sensing system.

BRIEF DESCRIPTION OF THE DRAWINGS

These and various other features of a capacitive touch sensing system and methods of operation will be apparent upon reading of the following detailed description in conjunction with the accompanying drawings and the appended claims provided below, where

DETAILED DESCRIPTION

An apparatus and method for pipelined conversions in touch sensing systems are described. In one embodiment, the method includes configuring a capacitive sensing system including a plurality of capacitive sensing elements for a first conversion, sensing capacitance in the capacitive sensing elements, and converting the capacitance sensed in the capacitive sensing elements to a digital, first conversion result, and, while converting the capacitance sensed to the first conversion result, reconfiguring the capacitive sensing system for a second conversion. In another embodiment, the capacitive sensing system includes a plurality of channels, and sensing capacitance and converting the capacitance sensed to the first conversion result includes integrating charge from capacitive sensing elements for at least one of the plurality of channels, sampling and holding a voltage equivalent to the sum of the charge once sufficient charge has been accumulated, and, while converting the sampled voltage equivalent of the sum of the integrated charge to a first digital sub conversion value, integrating charge from another or next of the plurality of channels. By subconversion it is meant the conversion of the sum or accumulated charge for one of the plurality of channels to a digital value, which is then digitally summed with previous subconversion results to produce, once all subconversions have been completed, a first conversion result.

The drawings described herein are only schematic and are non-limiting. In the drawings, the elements are not drawn to any specific scale or size and are present for illustrative purposes. The dimensions may not correspond to actual reductions to practice of the invention. For purposes of clarity, many details of touch sensing systems in general, and principles of operation of capacitive and resistive touch sensors which are widely known, have been omitted from the following description.

Figure 1:
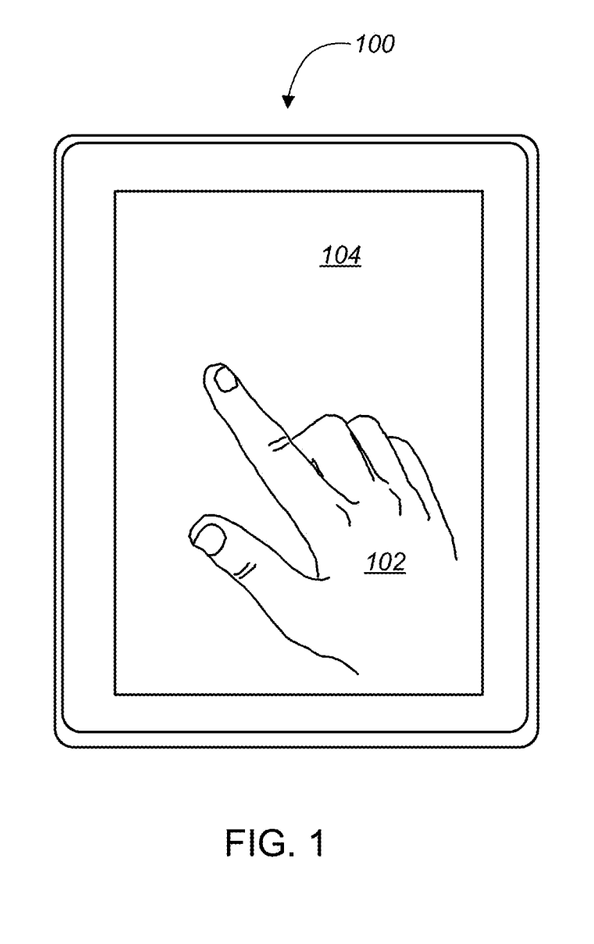
FIG. 1 is a block diagram of a device including a capacitive sensing system.

An electronic system or device 100 utilizing a capacitive sensing system for detecting a presence of a conductive object, such as a stylus or finger 102, is shown in FIG. 1. Referring to FIG. 1, in the embodiment shown the device 100 includes a touchscreen 104 that can detect the presence and location of one or more objects within a display area. Touchscreens are common in devices, such as tablet computers and smartphones, and enable a user to interact directly with information displayed. Although described with respect to a touchscreen 104, it will be appreciated that the apparatus and method of the present disclosure can be used with other sensing systems that do not incorporate a visual display, including a touchpad, scroll wheel, or scroll bar.

Figure 2:
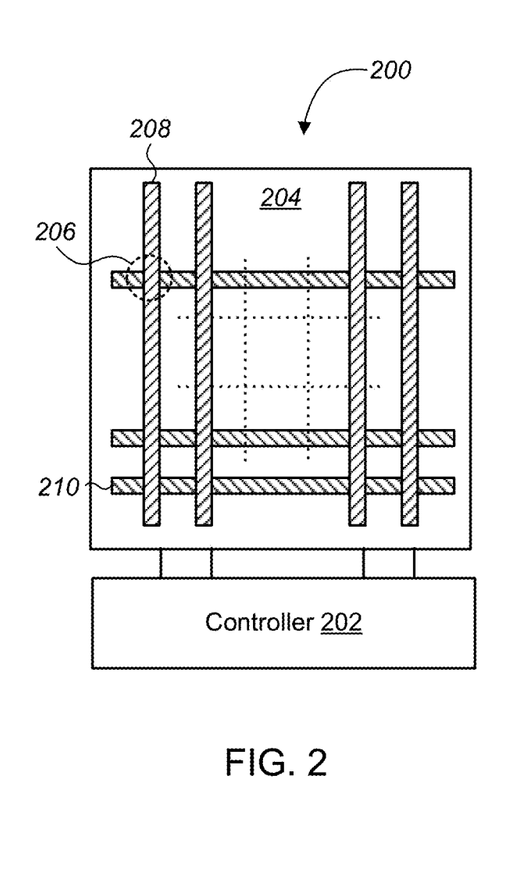
FIG. 2 is a block diagram of an embodiment of an array or matrix for a capacitive touch sensing system.

FIG. 2 illustrates a capacitive touch sensing system 200 including a controller 202 and an embodiment of an array or a matrix 204 of capacitive sensing elements 206, each formed from an intersection of one of a number of receive (RX) electrodes 208 and transmit (TX) electrodes 210. The presence of an object proximal to the matrix 204 of capacitive sensing elements 206 is detected through a change in the capacitance between the RX electrodes 208 and TX electrodes 210. The change in capacitance is detected by injecting charge into the TX electrodes 210, integrating an analog signal capacitively coupled to the RX electrodes, converting the integrated analog signal to a digital conversion result, and processing in the controller 202 the conversion result to provide an output related to the position, motion, or gesture of one or more objects proximal to the capacitive sensing elements.

In the embodiment shown, the capacitive sensing elements 206 are mutual capacitive sensing elements, in which the presence of an object, such as a finger or conductive stylus, changes the mutual coupling between row electrodes 210 and column electrodes 208. However, it is noted that the apparatus and method of the present disclosure can also be used with other types of capacitive sensing elements, including a self-capacitive sensing elements, also known as absolute capacitive sensing elements, in which the presence of an object changes or increases the capacitive load on each column or row electrode.

Figure 3A:
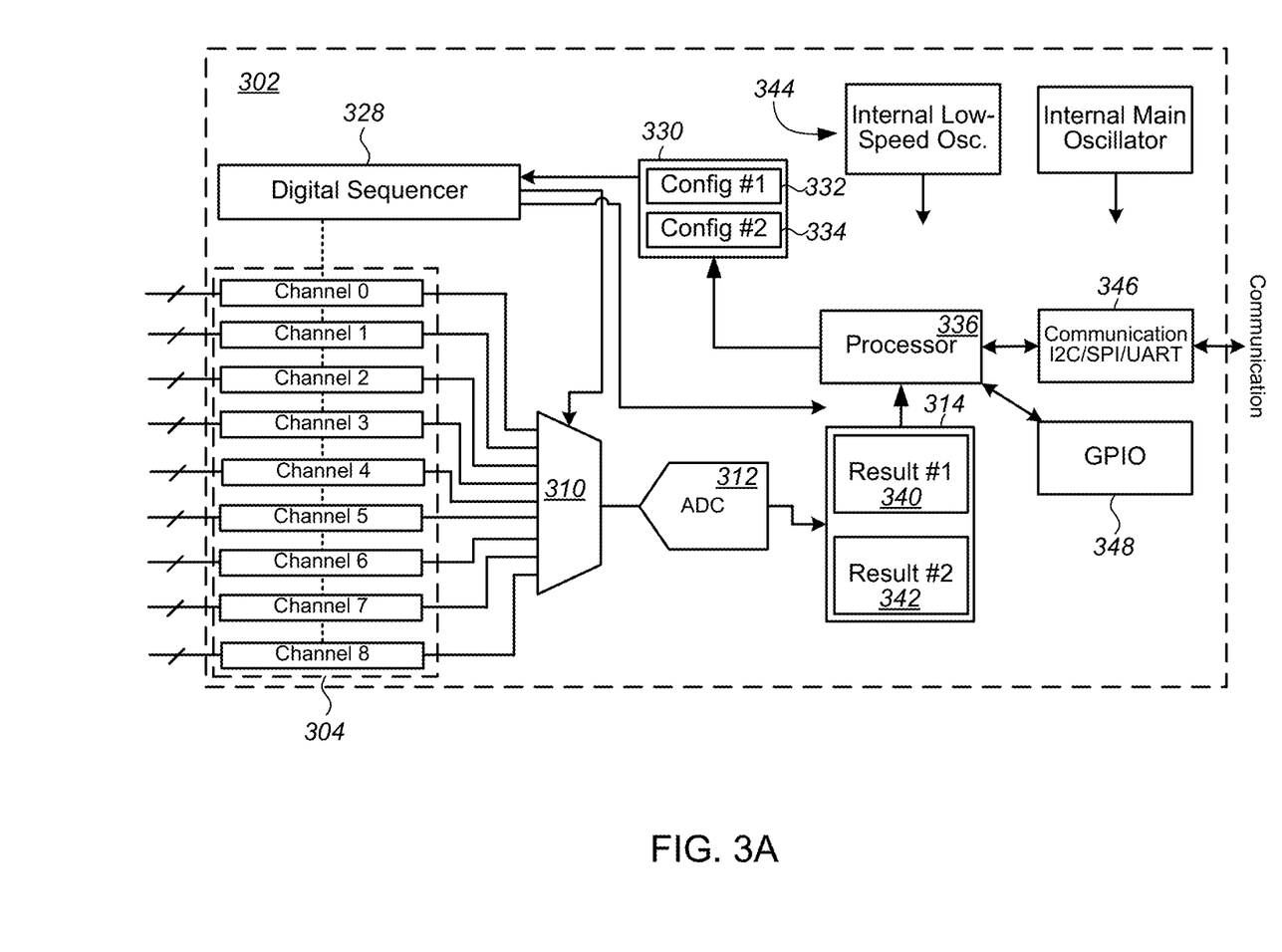
FIGS. 3A and 3B are block diagrams of an embodiment of a controller of a capacitive sensing system.
Figure 3B:
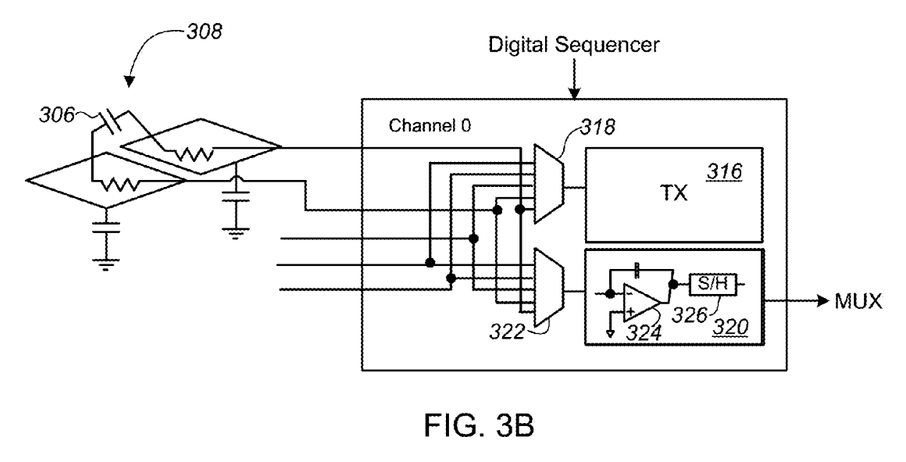

FIGS. 3A and 3B illustrate an exemplary embodiment of a controller 302 of a touch sensing system. Referring to FIG. 3A the controller 302 generally includes a number of sensing channels 304 coupled to capacitive sensing elements 306 in an array or a matrix 308 (a portion of which is shown schematically in FIG. 3B), and through a demultiplexor 310 to an analog to digital converter (ADC 312) to convert integrated analog signals to digital subconversion results and a memory 314 to accumulate the subconversion results for each of the plurality of channels, to produce, once all subconversions have been completed, a conversion result. Each channel 304, one of which is shown in detail in FIG. 3B, may include a transmit (TX) driver 316 to inject charge into TX electrodes of capacitive sensing elements 306 in the array 308 through a TX multiplexor 318, and a receive (RX) channel 320 coupled to RX electrodes through an RX demultiplexor 322 to receive a charge or analog signal capacitively coupled from the TX electrodes to the RX electrodes. In an alternate embodiment the TX driver 316 and multiplexor may be separate from the RX channels 304. The RX channel 320 may further include an analog integrator 324 to integrate the charge or analog signal capacitively coupled from the TX electrodes to the RX electrodes, and a sample-and-hold (S/H) stage 326 to sample and hold the voltage equivalent to the integrated charge once sufficient charge has been accumulated. In alternate embodiments, other circuits like an operational amplifier or current conveyor may be used to integrate charge.

A digital sequencer 328 is coupled to the channels 304, to a memory 330 including a first configuration memory block 332 and a second configuration memory block 334, and to the memory 314, which includes a first results memory block 340 and second results memory block 342. The digital sequencer 328, TX multiplexer 318, RX multiplexer 322, and associated sub-blocks within the remaining channels 304 are first configured using the information stored in the first configuration memory block 332. Once configured, the sequencer controls the generation of TX signals and the RX portion of each channel to measure the capacitances of a portion of the sensor matrix 308, and provide first conversion results based on information stored in the first configuration memory block 332, and stores the first conversion results into a first results memory block 340. Following completion of the first conversion the sequencer 328 accesses the second configuration memory block 334 to reconfigure the channels 304 to measure a portion of the sensor matrix 308, and provide second conversion results based on information stored in the second configuration memory block, and stores the second conversion results into a second results memory block 342. A processor 336 writes configuration information to first configuration memory block 332 and second configuration memory block 334, reads conversion results from the memory 314 and processes the conversion results to provide an output related to position, motion, or gesture of one or more objects proximal to the capacitive sensing elements. In certain embodiments, such as that shown, the configuration memory 330 includes a first configuration memory block 332 and a second configuration memory block 334, and the results memory 314 includes a first result memory block 340 and a second result memory block 342 to decouple the processor 336 from the scanning of the sensor matrix 308, enabling processor firmware to be written to support an interrupt driven operation instead of polling, while removing dead or non-productive time from the measurement process.

Although the memory 330, including the first configuration memory block 332 and second configuration memory block 334, and the results memory 314, including the first result memory block 340 and second result memory block 342, are represented in FIG. 3A by separate, discrete blocks or registers it will be understood that this need not be the case and that the configuration and results memories may comprise different locations within a single shared memory. The memory can be in the form of static or dynamic random access memory. If implemented with dynamic memory, the contents do not require refreshing as they are normally processed in under a millisecond. The memory may also be implemented in the form or latches, registers, flip-flops, logic elements, or other forms of volatile and non-volatile storage elements.

In addition to the above, the controller 302 generally further includes one or more internal oscillators 344 to provide clock signals to one or more of the components of touch sensing system, a communication block 346 to communicate with or be programmed by an external component, such as a host system or device, and a general purpose input/output (GPIO) block 348 through which the processor 336 can communicate or be programmed. The communication block 346 enables the capacitive sensing system to communicate with an external component by one or more of a number of standard communication interfaces and protocols, including $I^2C$ protocol, a Serial Peripheral Interface (SPI) protocol, or a universal asynchronous receiver/transmitter (UART) protocol.

Figure 4:
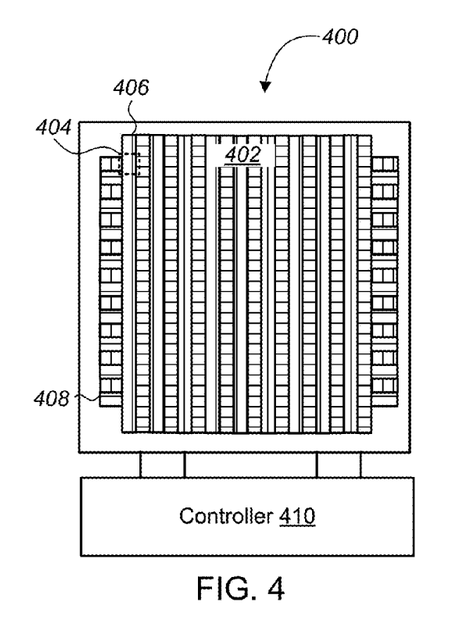
FIG. 4 is a block diagram of an embodiment of an array or matrix for a resistive touch sensing system.

Alternatively, in another embodiment the touch sensing system is a resistive touch sensing system 400 and includes a resistive sensor array 402 of resistive touch sensing elements 404, formed from an overlap area of a number of top flexible electrodes 406 and one or more of a number of lower electrodes 408 separated by an air gap or insulating microdots. As with the capacitive sensor embodiment described above, the resistive sensor array 402 is coupled to resistive sensor control circuitry embodied in the controller 410, as shown, or can in exist in a separate, distinct component or IC. The resistive touch sensing elements 404 of the resistive sensor array 402 respond to physical pressure on the surface of the touch sensor caused by a finger or other object in contact with the surface.

Figure 5:
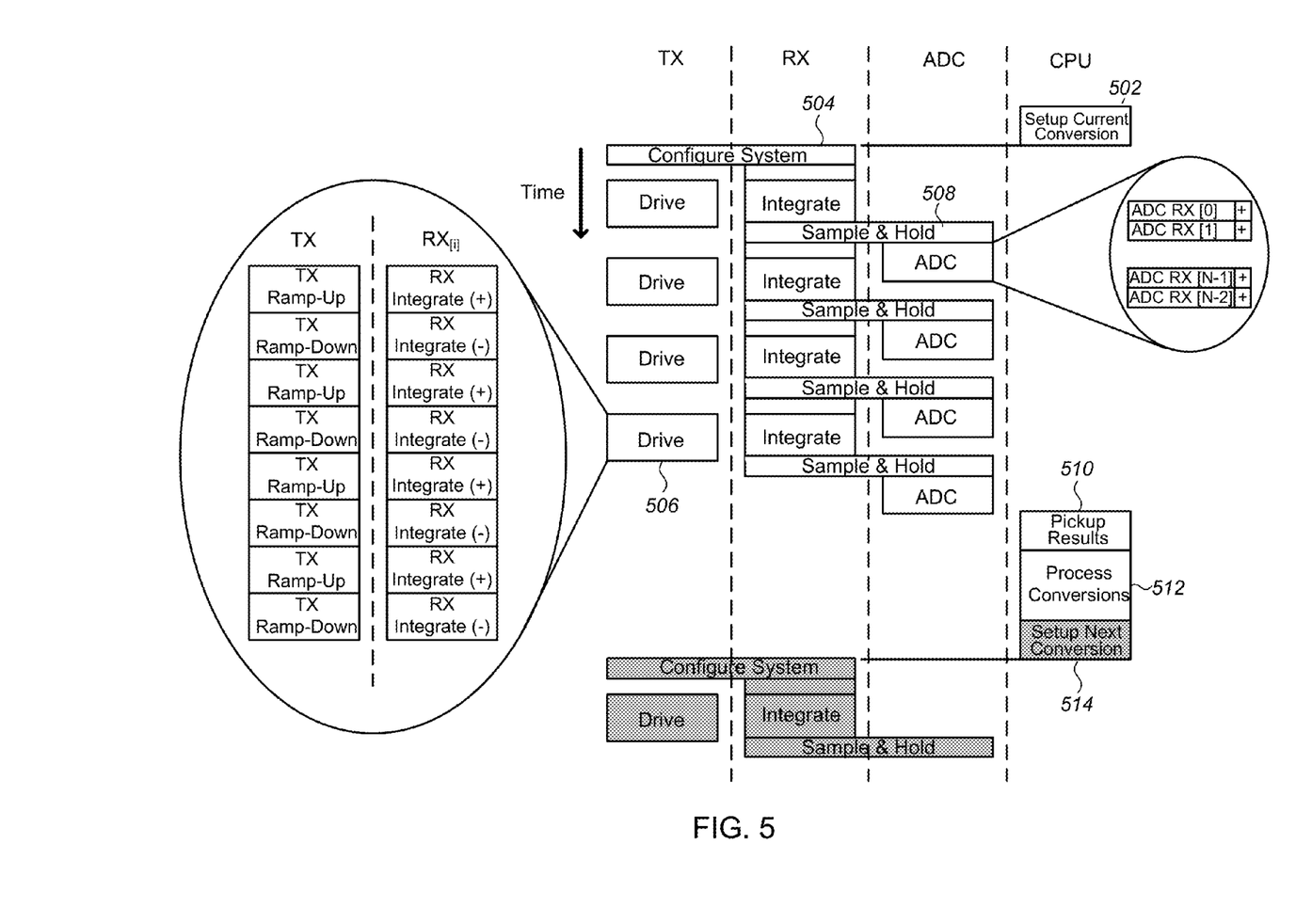
FIG. 5 is a block diagram of an embodiment of non-pipelined operation of a capacitive sensing system.

For purposes of comparison and to help distinguish the apparatus and method of the present disclosure, a non-pipelined method of operating a capacitive sensing system is now described with reference to FIG. 5. It will be understood that the blocks in FIG. 5 represent operations and not elements or components of the capacitive sensing system. It will further be understood that similarly named blocks, whether identified by a reference numeral or not, represent similar operations performed by the same or similar elements of the capacitive sensing system at a different time. For example, each of the blocks named Drive, under TX, represents an operation of injecting positive or negative charge into TX electrodes for a different one of a plurality of channels.

Referring to FIG. 5, a current or first conversion is shown in unshaded blocks, with the next or a second conversion shown in shaded blocks. In the method, multiple sets of operations are scheduled in both sequence and in parallel. The TX column shows when one or more enabled TX drivers inject charge into the sensor matrix. The RX column shows when the charge from the enabled TX drivers gets coupled into the RX channels, demodulated, and analog integrated. The ADC column shows when the analog integrated charge is measured by an ADC producing a digital subconversion result. The CPU column shows when the subconversion results have been digitally summed (or otherwise processed) to create a conversion result, and the CPU or processor acquires these results, processes same, and sets up the next conversion.

The method begins with the processor providing configuration information to the sequencer (block 502) to setup or configure the capacitive sensing system for the first conversion (block 504). Next, charge is injected into the sensor matrix (block 506) and the analog signals capacitively coupled to the RX electrodes are integrated, sampled, and held in a sample and hold circuit in the RX portion of the channel (block 508). Once all analog signals have been integrated the resulting analog level from the RX channel is converted to a subconversion result in the ADC and accumulated in an accumulator. Once subconversion results for all channels have been accumulated or summed in the accumulator to generate the first conversion result, an interrupt is generated directing the processor to pick up the conversion result (block 510). Alternatively, in some embodiments, the first conversion result may remain in the accumulator until it is polled by the processor. Next, the processor processes the first conversion result to provide an output related to position, motion, or gesture of one or more objects proximal to the capacitive sensing elements (block 512). Only after the processing of the first conversion result is complete does the processor provide configuration information to the sequencer to setup the capacitive sensing system for a next or second conversion (block 514).

As seen in FIG. 5, there are small delays within each conversion consisting of gaps between each subconversion, wherein the sequencer passes the captured analog level from each channel to the associated sample and hold circuit. This is followed by a much larger gap at the end of the last analog integration, through the sample hold sequence, followed by the ADC conversion of the levels captured in each sample and hold, accumulation of final conversion results, and the CPU picking up the results and setting up the system for the next conversion.

Figure 6:
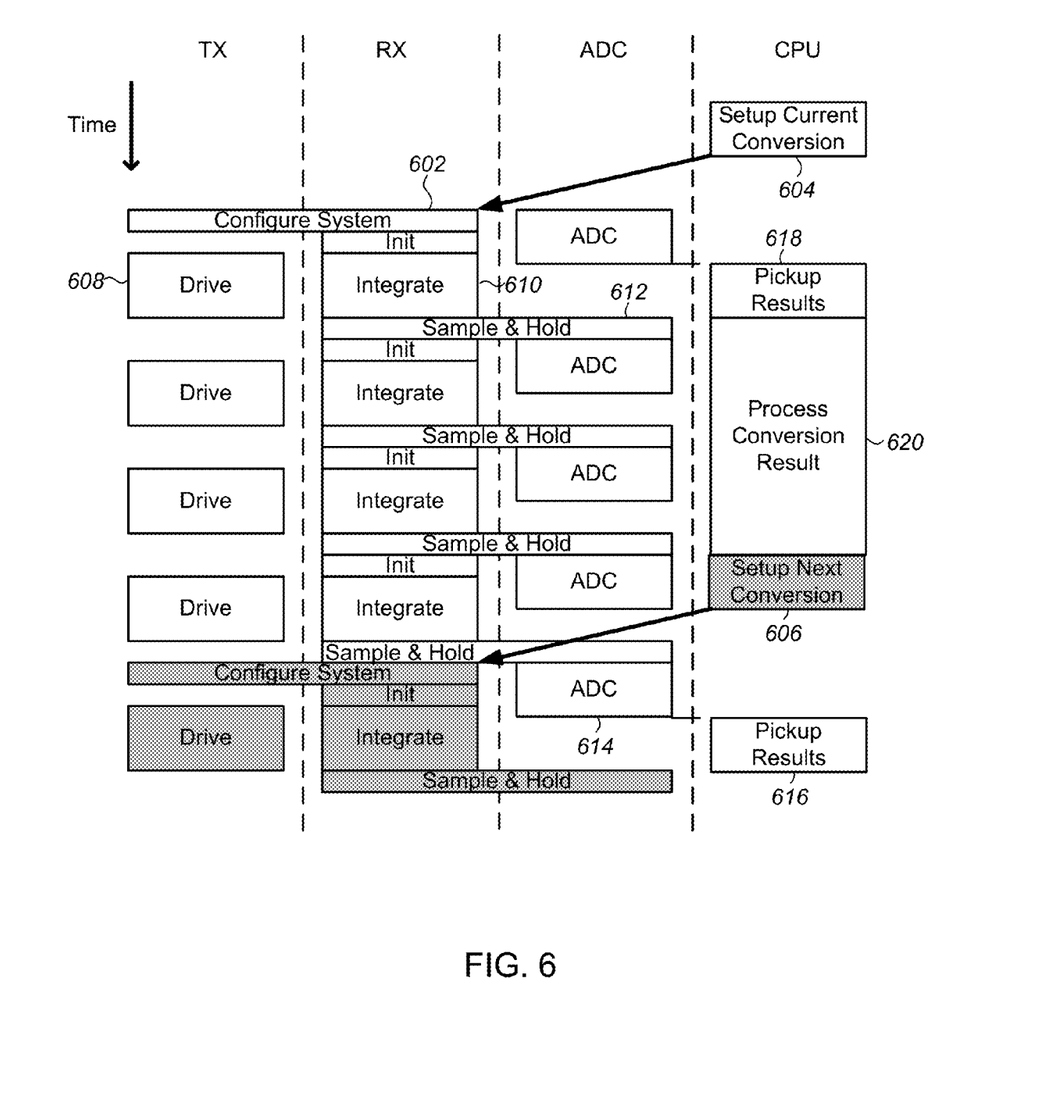
FIG. 6 is a block diagram of an embodiment of pipelined operation of the capacitive sensing system of FIG. 3.

An embodiment of a pipelined operation of the capacitive sensing system of FIG. 3 is now described with reference to the diagram of FIG. 6. As with FIG. 5 described above, it will be understood that the blocks in FIG. 6 represent operations and not elements or components of the capacitive sensing system. It will further be understood that similarly named blocks, whether identified by a reference numeral or not, represent similar operations performed by the same or similar elements of the capacitive sensing system at a different time.

Referring to FIG. 6, a current or first conversion is shown in unshaded blocks, and the next or a second conversion shown in shaded blocks. Briefly, by making configuration information for both the current or first conversion and the next or second conversion available to the sequencer, unused or dead time between conversions that were previously spent in unloading conversion results and loading new configuration information for the following conversion may be eliminated. To do this the sequencer must have access to at a minimum first and second configuration memory blocks to enable the processor or CPU to make configuration information for the second conversion available to the sequencer while the integration for the first conversion is still in progress, and to first and second result memory blocks to allow the processor time to remove the first conversion results before they are overwritten by a following conversion results.

Referring to FIGS. 3 and 6, in one embodiment the pipelined method of operation begins with configuring the capacitive sensing system for a first or current conversion with the sequencer 328 (block 602) using configuration information written to the first configuration memory block 332 by the processor 336 (block 604).

At any time following block 602, and before the last analog to digital conversion takes place to generate the first conversion result, the processor 336 may write configuration information for a second or next conversion to the second configuration memory block 334 (block 606). Next, for a first one of a plurality of channels, charge is injected into the matrix 308 through the TX electrodes (block 608) and coupled through the capacitive sensing elements 306 and into the RX electrodes. Charge from the TX electrodes is capacitively coupled into the RX electrodes, demodulated, and integrated in the integrator 324 of the RX channel 320 (block 610). When sufficient charge has been accumulated in the integrator 324, the associated voltage level is transferred to the S/H stage 326 within the RX channel 320 (block 612). This captured voltage level is then sequenced through the ADC 312 to generate a digital subconversion result which is then accumulated or summed into the associated results memory 314 (block 614). The above steps are repeated for each of the plurality of channels. Once subconversions have been completed for each of the plurality of channels, an interrupt to the processor 336 is generated to read the first conversion results which are stored in the first result memory block 340 (block 616).

As shown in FIG. 6, the processor 336 can pick up conversion results for a previous conversion (block 618), process the conversion results (block 620) and write configuration information for the second or next conversion to the second or next configuration memory block 334 while the sequencer 328 is sensing the capacitance in a first conversion to a first conversion result at any time before the last integration (block 610) of the conversion is complete and has been passed to the sample and hold (block 612). It will further be appreciated that these operations need not be performed in the order illustrated in FIG. 6. For example, the processor 336 could be operated to write a setup for the second conversion to the second configuration memory block 334, before picking up conversion results of a previous conversion.

Figure 7:
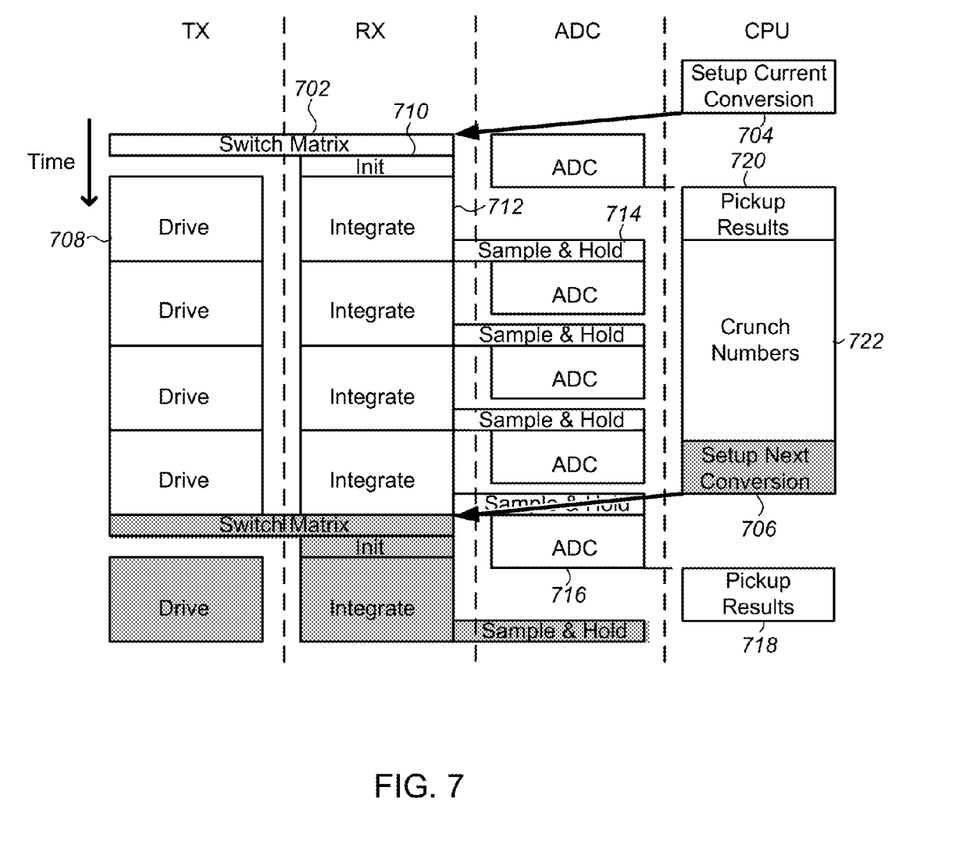
FIG. 7 is a block diagram of an embodiment of pipelined operation with continuous integration of the capacitive sensing system of FIG. 3.

In another embodiment, shown in FIG. 7, operation of the capacitive sensing system can be further pipelined to enable continuous integration of charge into the RX channels across subconversion boundaries.

As with FIGS. 5 and 6 described above, it will be understood that the blocks in FIG. 7 represent operations and not elements or components of the capacitive sensing system. It will further be understood that similarly named blocks, whether identified by a reference numeral or not, represent similar operations performed by the same or similar elements of the capacitive sensing system at a different time.

Referring to FIG. 7, a current or first conversion is shown in unshaded blocks, and the next or a second conversion is shown in shaded blocks. Note that with continuous integration the short dead times between subconversions present in the methods of FIGS. 5 and 6 have been removed. With the exception of a short period of setting of initial conditions (e.g., biasing the electrodes connected to the RX channels) before the first subconversion of a conversion, there are no longer any dead or wasted time between the subconversions, shortening the time for the overall conversion.

A further advantage of the continuous integration embodiment of FIG. 7 is that it substantially reduces spectral noise response of the receive channels. The noise response of the system is determined by the mix product of the noise signal and the sampling frequency of the associated TX signal. When discontinuous integration is used to capture capacitance changes, there are at least two different sampling frequencies present: the higher frequency of the TX signal, and the lower frequency of the gaps between subconversions. These two frequencies combine to form two fundamental frequencies, and upper and lower mix products, each of which combine with the system noise to create many more frequencies where the noise can couple into the receive channels. A further advantage of this embodiment is that it substantially narrows the receiver channel passband by demodulating the receiver 320 with a substantially constant frequency.

Referring to FIGS. 3 and 7, in one embodiment the pipelined method of operation with continuous integration begins with configuring the capacitive sensing system for the first conversion with the sequencer 328 (block 702) using configuration information written to a first configuration memory block 332 by the processor 336 (block 704).

As with the embodiment shown in FIG. 6 and described above, at any time following block 704, and before the last analog to digital conversion takes place to generate the first conversion result, the processor 336 may write configuration information for a second or next conversion to the second configuration memory block 334 (block 706). After a short period of setting initial conditions in all RX channels (block 710), the one or more TX drivers are enabled to continuously inject charge into the sensor matrix 308 (block 708) wherein it is capacitively coupled into each RX electrode. Charge from the RX electrodes is coupled into each enabled RX channel, wherein it is demodulated, and continuously integrated in the RX channel 320 (block 712). When sufficient charge has been accumulated from synchronous demodulation, the associated charge level is captured as a voltage in a sample and hold circuit within each RX channel 320 (block 714).

This captured voltage level is then sequenced through the ADC 312 to generate a digital subconversion result which is then accumulated or summed in the associated results memory 314 (block 716). The above steps are repeated for each of the plurality of channels 304. Once all subconversions for the current conversion have been completed for each of the plurality of channels, an interrupt is generated to the processor 336 to read the first conversion results which are stored in the first result memory block 340 (block 718).

As with the embodiment shown in FIG. 6 and described above, the processor 336 can pick up conversion results for a previous conversion (block 720), process the conversion results (block 722) and write configuration information for the second or next conversion to the second configuration memory block 334 (block 706) while the sequencer 328 is sensing the capacitance in a first conversion result at any time before the last integration (block 712) is complete and before the final ADC conversions are processed (block 716).

Thus, embodiments of a touch sensing system configured for pipelined operation and methods for operating the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of a touch sensing system configured for pipelined operation and methods for operating the same of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. A method comprising:
    at a capacitive sensing system including a plurality of capacitive sensing elements coupled to a plurality of channels, wherein the plurality of channels are electrically coupled to an analog-to-digital converter (ADC), and the capacitive sensing system includes a transmit (TX) driver, a TX multiplexer, and a receive (RX) multiplexer:
        configuring the TX driver, TX multiplexer, and RX multiplexer with a sequencer using first configuration information obtained from a first configuration memory block;
        after configuring the TX driver, TX multiplexer, and RX multiplexer, sensing capacitance in the capacitive sensing elements, and converting the capacitance sensed in the capacitive sensing elements to a first conversion result by the ADC; and
        while converting the capacitance sensed to the first conversion result by the ADC, concurrently reconfiguring the TX driver, TX multiplexer, and RX multiplexer with the sequencer using second configuration information obtained from a second configuration memory block, wherein a second conversion result is obtained by the ADC in accordance with reconfiguring of the TX driver, TX multiplexer and RX multiplexer.

2. The method of claim 1, wherein the first and second configuration information is written to the respective first and the second configuration memory blocks by a processor.

3. The method of claim 2, further comprising while converting the capacitance sensed to the first conversion result, receiving in the processor a result for a conversion performed prior to the first conversion.

4. The method of claim 3, further comprising while converting the capacitance sensed to the first conversion result, processing in the processor the result for the conversion performed prior to the first conversion to provide an output related to position, motion or gesture of an object proximal to the capacitive sensing elements.

5. The method of claim 4, wherein reconfiguring the capacitive sensing system for the second conversion is performed after receiving in the processor the result for the conversion performed prior to the first conversion.

6. The method of claim 4, wherein reconfiguring the TX driver, TX multiplexer, and RX multiplexer is performed after processing in the processor the result for the conversion performed prior to the first conversion.

7. The method of claim 3, wherein receiving in the processor the result for the conversion performed prior to the first conversion comprises receiving the result from a first result memory block.

8. The method of claim 7, further comprising storing the first conversion result in a second result memory block.

9. The method of claim 8, wherein sensing capacitance and converting the capacitance sensed to the first conversion result comprises integrating analog signals from the capacitive sensing elements and converting the integrated analog signals to a digital subconversion result.

10. The method of claim 9, wherein converting the integrated analog signals to a digital subconversion result comprises integrating analog signals from the capacitive sensing elements for a first one of the plurality of channels, and integrating analog signals from the capacitive sensing elements for a second one of the plurality of channels while converting the integrated analog signals for the first one of the plurality of channels to a digital subconversion result.

11. The method of claim 9, further comprising storing a sum of the sub conversion results from the plurality of receive channels in the second result memory block, and generating an interrupt to the processor to read the results from the second result memory block.

12. A method comprising:
at a capacitive sensing system including capacitive sensing elements coupled to a plurality of channels, wherein the plurality of channels are electrically coupled to an analog-to-digital converter (ADC), and the capacitive sensing system includes a transmit (TX) driver, a TX multiplexer, and a receive (RX) multiplexer:
configuring the TX driver, TX multiplexer, and RX multiplexer with a sequencer using first configuration information from a first configuration memory block;
integrating analog signals from the capacitive sensing elements for a first one of the plurality of channels;
integrating analog signals from the capacitive sensing elements for a second one of the plurality of channels while concurrently converting by the ADC the integrated analog signals for the first one of the plurality of channels by the ADC to a digital subconversion result; and
reconfiguring the TX driver, TX multiplexer, and RX multiplexer for a second conversion with the sequencer using second configuration information from a second configuration memory block while converting by the ADC the capacitance sensed for the plurality of channels to digital subconversion results and summing the sub conversion results from the plurality of channels to generate a first conversion result.

13. The method of claim 12, wherein the capacitive sensing system comprises a processor, the method further comprising: summing the subconversion results from the plurality of channels to generate a first conversion result, storing the first conversion result in a result memory block, and generating an interrupt to the processor to read the first conversion result from the result memory block.

14. A capacitive sensing system comprising:
a matrix of capacitive sensing elements coupled to a plurality of channels, wherein the plurality of channels includes a transmit (TX) driver, a TX multiplexer, and a receive (RX) multiplexer, and the matrix is configured to detect a presence of an object via capacitive coupling;
an analog-to-digital converter (ADC) coupled to the plurality of channels; and
a controller to convert analog measurements of capacitance received from the matrix to digital conversion results, the controller including first and second configuration memory blocks coupled to a sequencer and a processor;
wherein:
the sequencer is configured to configure the TX driver, TX multiplexer, and RX multiplexer based on first and second information stored in the respective first and second configuration memory blocks, and the processor writes information to the first and second configuration memory blocks; and
the sequencer is configured to reconfigure the TX driver, TX multiplexer, and RX multiplexer based on second information stored in the second configuration memory block to provide a next conversion result while the ADC converts the capacitance sensed to a current conversion result.

15. The system of claim 14, wherein the controller further comprises first and second result memory blocks, and wherein the processor is configured to read a prior conversion result from the first result memory block while the sequencer is converting the capacitance sensed to the current conversion result.

16. The system of claim 15, wherein the processor is configured to process the prior conversion result to provide an output related to position, motion or gesture of an object proximal to the capacitive sensing elements, while the sequencer is converting the capacitance sensed to the current conversion result.

17. The system of claim 16, wherein the processor is configured to write information to the second configuration memory block for reconfiguring the capacitive sensing system for the next conversion result, while the sequencer is converting the capacitance sensed to the current conversion result.

* * * * *